(12) United States Patent
Stoiber et al.

(10) Patent No.: US 8,267,387 B2
(45) Date of Patent: Sep. 18, 2012

(54) DEVICE FOR THE HANDLING OF CONTAINERS

(75) Inventors: Christian Stoiber, Michelsneukirchen (DE); Wolfgang Schonberger, Pettendorf (DE); Gerhard Schwod, Regensburg (DE)

(73) Assignee: Krones AG, Neutraubling (DE)

( * ) Notice: Subject to any disclaimer, the term of this patent is extended or adjusted under 35 U.S.C. 154(b) by 1127 days.

(21) Appl. No.: 12/046,985

(22) Filed: Mar. 12, 2008

(65) Prior Publication Data

US 2008/0224373 A1  Sep. 18, 2008

(30) Foreign Application Priority Data

Mar. 13, 2007  (DE) .......................... 10 2007 011 931

(51) Int. Cl.
*B23Q 3/08* (2006.01)
(52) U.S. Cl. ........................................ 269/48.2; 269/55
(58) Field of Classification Search ................. 269/48.2, 269/48.1, 55, 47, 54.1, 60, 73, 329
See application file for complete search history.

(56) References Cited

U.S. PATENT DOCUMENTS

| | | | | |
|---|---|---|---|---|
| 2,625,896 A | * | 1/1953 | Immenroth | 72/346 |
| 4,352,232 A | * | 10/1982 | Winders et al. | 29/243.56 |
| 4,572,355 A | | 2/1986 | Hunter | |
| 4,871,492 A | | 10/1989 | Spoetzl | |
| 5,730,433 A | * | 3/1998 | Veres | 269/41 |
| 6,308,944 B1 | * | 10/2001 | Ota et al. | 269/97 |
| 6,546,609 B1 | * | 4/2003 | Lee et al. | 29/243.53 |
| 6,655,672 B2 | * | 12/2003 | Tsuruta | 269/21 |
| 6,691,391 B2 | * | 2/2004 | Lin | 29/281.5 |
| 6,848,896 B2 | | 2/2005 | Effenberger | |
| 2003/0082261 A1 | | 5/2003 | Effenberger | |
| 2008/0224373 A1 | * | 9/2008 | Stoiber et al. | 269/48.2 |
| 2012/0035754 A1 | * | 2/2012 | Oldani | 700/96 |

FOREIGN PATENT DOCUMENTS

| | | |
|---|---|---|
| DE | 3623099 | 1/1988 |
| DE | 9101026 U1 | 5/1991 |
| DE | 4416262 | 5/1995 |
| DE | 10154325 | 5/2003 |
| EP | 0265713 | 5/1988 |
| FR | 2 720 679 A1 | 12/1995 |
| FR | 27200679 | 12/1995 |

OTHER PUBLICATIONS

European Search Report based on European Patent No. 08 00 1037; Date of Mailing; Jun. 26, 2008.

* cited by examiner

*Primary Examiner* — Lee D Wilson
(74) *Attorney, Agent, or Firm* — Marshall, Gerstein & Borun LLP (57) ABSTRACT

A device (1) for the handling of containers with a mandrel (4), the cross-section of which is adjusted to the cross-section of one of the containers to be handled, whereby the mandrel (4) is displaceable, relative to the support device (30), along a direction of movement (L) between a resting position and a working position. The device has a spacing element (10) which is displaceable relative to the mandrel (4) in a direction of displacement (R) between at least two positions, whereby the direction of displacement (R) and the direction of movement form an angle with one another that differs by 0°, and whereby this spacing element is constructed in such a manner that the working position of the mandrel (4) in the direction of movement (L) is changed through a shifting of the spacing element.

13 Claims, 4 Drawing Sheets

DEVICE FOR THE HANDLING OF CONTAINERS

CROSS-REFERENCE TO RELATED APPLICATION

The present application claims the benefit of priority of German Patent Application No. 10 2007 011 931.5, filed Mar. 13, 2007. The entire text of the priority application is incorporated herein by reference in its entirety.

FIELD OF THE DISCLOSURE

The disclosure relates to a device for the handling of containers, such as beverage containers.

BACKGROUND

The most varied devices for the handling of containers, such as labeling machines, blow molding machines, inspection devices for containers and the like, for example, are already known from the state of the art. The use of plastic bottles as beverage containers has become ever more prevalent in recent times. During the manufacturing process, such types of plastic containers are initially present as molding blanks, although the threading is already preformed, however. The body of this molding blank is heated and then inflated during a blowing process, so that the finished plastic bottle is made available as the result of this blowing process.

It is thereby necessary to guide the molding blanks in an appropriate manner and, in particular, to guide them in an appropriate manner during the heating process and the actual blowing process. For this purpose, the devices have a mandrel that engages in the aperture of the container and thus guides the container.

Thus, this mandrel must have a precisely defined length relative to the container or to the aperture of the container, as the case may be. A mandrel that is too long leads to the fact that the heating may proceed defectively, particularly in the area below the threading. A mandrel that is too short can lead to the fact that the container does not have a secure hold relative to the mandrel.

Molding blanks and containers or bottles, as the case may be, which have a shorter threading or a shorter aperture relative to earlier containers, as the case may be, have recently become known. This shorter threading serves, in particular, to save weight in the aperture of the container, as well as to save on manufacturing costs.

Both containers with longer threadings as well as containers with shorter threadings, whereby these threadings have the same cross-section, are thereby handled on the same apparatuses or devices. In the event that it is necessary to switch from one such type of bottle to another type of bottle, in particular, it is necessary to adjust the height of the mandrel or the position of the mandrel, as the case may be, relative to the container. This is necessary because the support- or securing rings, as the case may be, must lie in a precisely defined plane below the threadings during the processing of the containers, even in the case of different type of bottles.

For this purpose, it is also known from the state of the art to replace the entire mandrel in order to slightly lower its working position, in which it is inserted into the aperture, in order to adjust the position of the mandrel to a shorter threading. Thus, the position of the support- or securing ring, as the case may be, can always remain in the same plane, even with different types of threadings during each handling process.

In the state of the art, the mandrels are thereby inserted into the container or into its aperture, as the case may be, from the top, and then removed again after the corresponding handling process.

Switching from one type of container to another type of container is thereby associated with very high expense, however, since each mandrel support must be provided with another mandrel corresponding to the same.

In addition, devices in which the position of the mandrel relative to the container or relative to a clamp that holds the neck of the containers, as the case may be, is varied by means of a rotational process, are also known. This rotational process is also relatively time-consuming, however, and must be carried out manually.

SUMMARY OF THE DISCLOSURE

The task which thus forms the basis for the disclosure is that of making available a device for the handling of containers which permits a switching of the positions of the mandrels in a comparatively short time and, advantageously, without manual intervention.

The device in accordance with the disclosure for the handling of containers has a mandrel, the cross-section of which is adjusted to the internal cross-section of one of the containers to be handled. The mandrel is thereby displaceable relative to a support on which it is provided along a direction of movement between several positions, but at least one resting position and one working position, however, and preferably two resting positions and two working positions.

In accordance with the disclosure, the device has a spacing element displaceable relative to the mandrel in one direction of displacement between at least two positions, whereby the direction of displacement and the direction of movement form an angle with one another that differs by 0°, and whereby this spacing element is configured in such a manner that the resting position of the mandrel along the direction of movement is changed by means of a shifting of the spacing element. The direction of movement is thereby preferably perpendicular to a guiding plane in which the mandrel with the container is guided—such as through a heating device or through a blowing device, for example.

The mandrel can assume at least three positions, and preferably at least four positions. The highest position—resting position number one—is thereby the position in which the mandrel is located the furthest towards the top. This position is intended for molding blanks with the highest threadings to be processed. Resting position number two is a high position, in which the mandrel is moved downwardly along the direction of movement relative to resting position number one by the difference in the threading heights of the molding blank to be processed. Resting position number two is reached through the insertion of a spacing element. The resting positions are the positions in which the molding blanks or containers, as the case may be, are located in a handling position, such as in a heating oven during heating, for example.

The mandrels are brought into working positions in order to take over the machines upstream or to pass them along to the following machines, as the case may be. Working position number one is thereby the lowest position that the mandrel can occupy for reason of its design and its geometrical dimensions. This position is intended for the transfer or the reception of molding blanks, as the case may be, with the lowest threading heights to be processed. If a molding blank with a higher threading height is processed, then the mandrel occupies working position number two upon the reception or transfer of the molding blank, as the case may be, which position differs from working position number one by the difference in the threading height. In this way, it is guaranteed that, upon the transfer and/or the reception of molding blanks with different threading heights, the support- or securing rings, as the case may be, are always located in the same plane. The position of the resting positions is preferably defined by means of a spacing element, while the position of the working positions is preferably determined by means of a lead cam.

If molding blanks with more than two different threading heights but with the same diameter are processed, then it is necessary for the mandrel to be able to occupy one resting position and one working position for each threading height to be processed.

The mandrel is, in particular, thereby adjusted to the cross-section of the container to be handled in such a manner that it can be inserted precisely into the same.

The spacing element is likewise preferably displaceable precisely between two positions. In the one position, the mandrel is thereby lowered by a predetermined range and, in the second position, in which the spacing element is preferably removed, the mandrel is in a higher position. The latter situation is appropriate for containers with longer threadings.

The spacing element is preferably displaceable in a direction proceeding essentially perpendicular to the direction of movement. In this embodiment, the spacing element is thereby perpendicular to the direction of movement, and is preferably inserted above the mandrel in order to change the working position of the mandrel. In accordance with one particularly preferred further configuration of the disclosure, the spacing element is inserted between a support and the mandrel.

It is brought about by means of the device in accordance with the disclosure that the working position of the mandrel can be changed without manual help. It is thereby possible to set a specific switching mode in which the mandrel is pressed into one of the working positions, for example, and the spacing element is inserted into this position at the same time. In a corresponding manner, it is also possible to automatically remove the spacing element again in order for a resetting to containers with longer threadings to be possible again.

In one additional advantageous embodiment, the spacing element has a fork-shaped spacing body. This spacing body is thereby preferably inserted into an element provided above the mandrel which is in a fixed connection with the mandrel. It is to be understood by "fork-shaped" that the spacing body has two external projections which project, in the direction of displacement, in the direction of the mandrel, as well as a recess provided between these projections. In general terms, the spacing element or the spacing body, as the case may be, has an open circumference and is, in particular, not thereby constructed as a closed ring or as a closed circular disk.

The mandrel is preferably configured to be rotatable around its own axis and on a shaft, and the spacing element at least partially encompasses this shaft in one position of the spacing element. In other words, the fork-shaped spacing body is positioned here partly around this shaft or at least partially encompasses it, as the case may be. In this way, a more secure hold of the spacing element can be guaranteed.

A guide bolt is preferably provided on the spacing element, whereby this guide bolt preferably extends in the direction of movement. As is explained in further detail, this guide bolt serves for the purpose of drawing the spacing element out again, and thereby switching to the resting position again on containers with longer threadings. The spacing element preferably has at least one level, whereby this level or this indentation, as the case may be, is formed in the direction of movement. The guide bolt can also be inclined relative to the direction of movement by a predetermined angle, such as 10° or 20°, for example.

In one preferred embodiment, the spacing body is provided on a displacement body in a detachable manner. It is thereby achieved that the device can be adjusted to different shaft diameters without excessive expense. It is also possible, for example, to select the displacement body and the spacing body as a uniform component and to provide spacing elements, with each one differing in dependence on the specific devices.

In one additional advantageous embodiment, the device has a first adjusting device which is positioned, at least occasionally, between the guide bolt and the spacing body. This adjusting device, such as a hydraulic, pneumatic, or motor-driven adjusting device, for example, serves for the purpose of removing the guide bolt, and thereby the spacing body, and of consequently setting resting position number one. In one further advantageous embodiment, the device has a second adjusting device, and the spacing element is at least occasionally positioned between this second adjusting device and the shaft. This second adjusting device serves to move the spacing element in, and to thereby switch to shorter threadings, for example.

It is, however, also possible to provide other mechanisms that make possible a movement of the spacing element, such as electrical motors, magnets, or the like, for example, instead of these adjusting devices.

The first adjusting device and the second adjusting device are preferably displaced laterally opposite to one another. There is to be understood by "lateral displacement" a lateral displacement in the direction of movement of the mandrel.

A lead cam, which brings about a movement of the mandrel or of the device, as the case may be, along the direction of movement, is additionally provided. The rail can, in accordance with the disclosure, thereby be moved in the direction of movement in at least sections and, preferably, in its entirety. This means that the complete guide or control cam, as the case may be, which controls the placement of the working positions of the mandrel, changes its height in relation to a support or a suspension mounting, as the case may be.

Through this movement of the guide or control cam in the direction of movement, it is possible to switch between working position number one and working position number two of the mandrel, whereby the working positions serve for the transfer of the container to other elements, such as revolving star wheels.

The device is preferably constructed in the manner described above.

The present disclosure is, furthermore, directed at a process for the handling of containers, whereby a mandrel, the cross-section of which is adjusted to the cross-section of the container to be handled, is inserted into the aperture of this container, at least in sections, and whereby the mandrel is displaceable in one direction of movement between a resting position and a working position. In accordance with the disclosure, a change between a resting position number one and a resting position number two is brought about through the fact that a spacing element is displaced in a direction of displacement, whereby the direction of movement and the direction of displacement together form an angle with one another that differs by 0°. The direction of movement and the direction of displacement preferably form an angle with one another that lies between 45° and 135°, preferably between 60° and 120°, and, particularly preferably, between 80° and 100°.

In one additional process in accordance with the disclosure, a mandrel, the cross-section of which is adjusted to the cross-section of the container to be handled, is inserted into the aperture of this container, at least in sections, whereby the mandrel is displaceable in a direction of movement between a resting position and a working position. In accordance with the disclosure, the movement of this mandrel is controlled here with the help of a guide rail, and the position of the guide rail can be changed in the direction of movement relative to a stationary base.

BRIEF DESCRIPTION OF THE DRAWINGS

Further advantages and embodiments of the present disclosure emerge from the attached diagrams. These depict the following.

DETAILED DESCRIPTION OF THE PREFERRED EMBODIMENT

Figure 1:
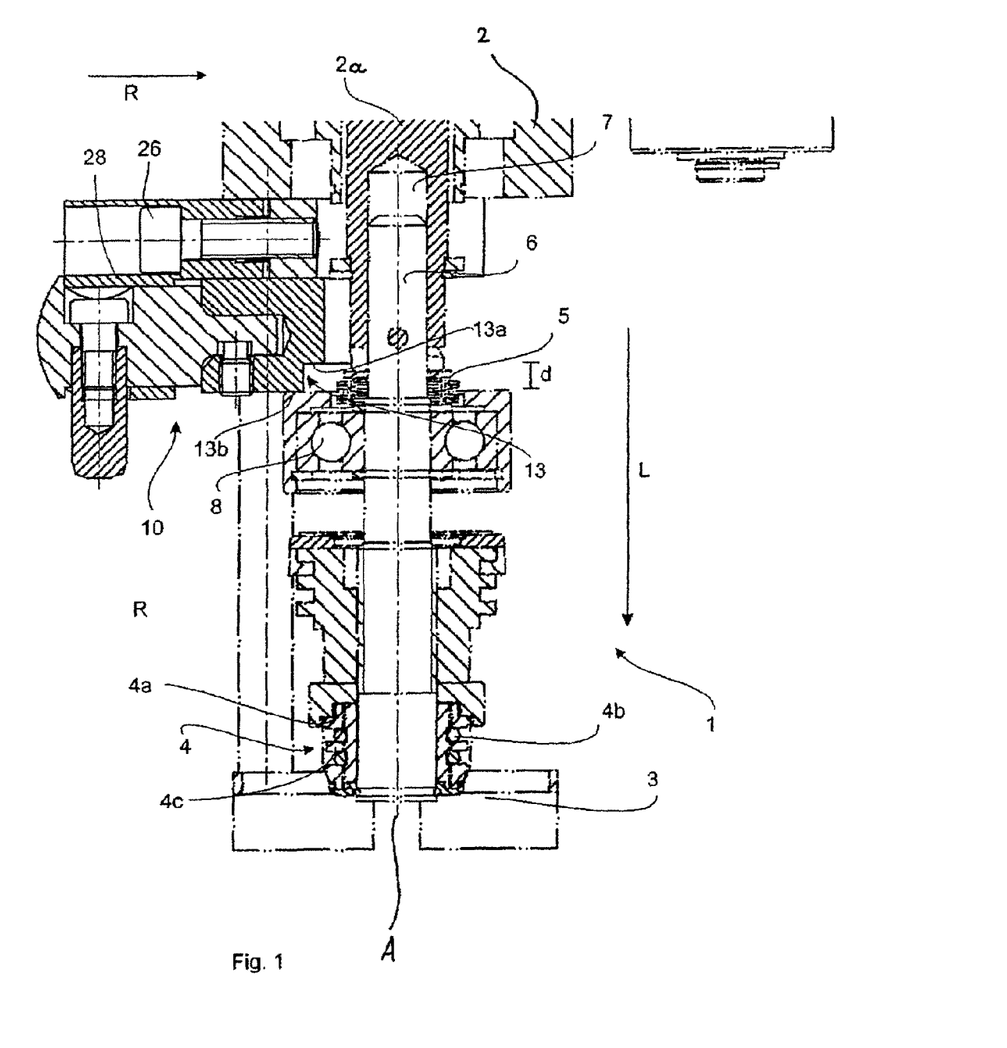
FIG. 1: A device in accordance with the disclosure.

FIG. 1 depicts a device 1 in accordance with the disclosure for the handling of beverage containers. This device 1 has a mandrel or heating mandrel, as the case may be, which is identified in its entirety as 4 and is inserted into the aperture of the container to be handled (not depicted). Reference number 3 thereby refers to a shielding which thermally insulates an area to be heated which is below this shielding 3 against the area positioned above this shielding 3. The body of plastic that is to be inflated (such as PET bottles, for example) is located below this shielding 3 during the handling process. Reference number 4-a refers to a stopping unit which is provided on the mandrel 4, and against which the edge of the aperture of the container 20 impacts. In order to bring the mandrel 4 into the container, the mandrel 4 is displaced downwardly along the direction of movement L, along with a mandrel support 2-a. The (lower) working position number one of this mandrel 4 is thereby determined by a lead cam (not depicted). Reference number 4-b refers to an O-ring. Reference number 4-c refers to a gripping device which engages with the internal circumference of the container to be handled.

In the event that a switch is now to be made from containers 20 with longer threadings to containers 20 with shorter threadings, the relative position between the mandrel and the threading is moved. Corrections of the working position and of the resting position are thereby necessary. In the state of the art, a change of the parts of the mounting is thus necessary upon switching over to another threading height. Reference number 6 refers to a shaft for the rotatable support of the mandrel 4. This rotatable support is provided in a support 8.

Reference number 10 refers to a spacing element illustrated below in the detailed diagram. This spacing element 10 is positioned opposite to a rail 28, which is mounted solidly on a support 2 with the help of a screw 26. The position of the shaft 6 relative to the mandrel support 2-a, and thereby the resting position of the mandrel 4, can be changed through the insertion of the spacing element 10 in one direction of displacement R. The shaft 6 is movable within a recess or boring 7, as the case may be, of the support.

A switching over to different threading heights can be carried out by means of a level 13 or the distance d between the two surfaces 13-a and 13-b, as the case may be. It would thereby even be conceivable, in principle, for several such types of gradations to be present and for transitions to several different threading heights to thereby be possible.

First of all, the device in accordance with the disclosure is set to the lowest threading height. In the event that a change to containers 20 with longer threadings is necessary, the spacing element 10 is drawn against the direction R, that is to say, outwardly, in order to then bring the mandrel 4 into resting position number one.

If the mandrel 4 were now pressed downwardly into working position number one, then the collar 20-a would occupy a position relatively further below the collar 20-a of the container 20 with a short threading. In this position, however, the container 20 cannot be taken up by the following transport star wheels, because its height level is firmly set. In containers 20 with long threadings, a working position number two, which is, considered in relative terms, positioned higher up than working position number one and, specifically so, in such a manner that the height level of the collar 20-a of the container 20 (regardless of whether this has short or long threadings) does not change at the point in time of the transfer to the next following transport star wheel, must thus be applied. In this way, it is brought about that a reception of the containers 20 is always achieved above a collar 20-a.

In the reception position, however, the mandrel 4 always reaches its lowest position. This has the advantage that imprecisions in the adjustment of the height cannot appear, or can only appear infrequently, as the case may be, which point is enormously important for the transfer of transport star wheels. In order to nevertheless still reach the transfer height, the guide rail 38-a, 38-b (not depicted in FIG. 1) is displaced in its entirety, so that the relative height between the transport star wheel and the mandrel 4 can be adjusted.

Figure 2:
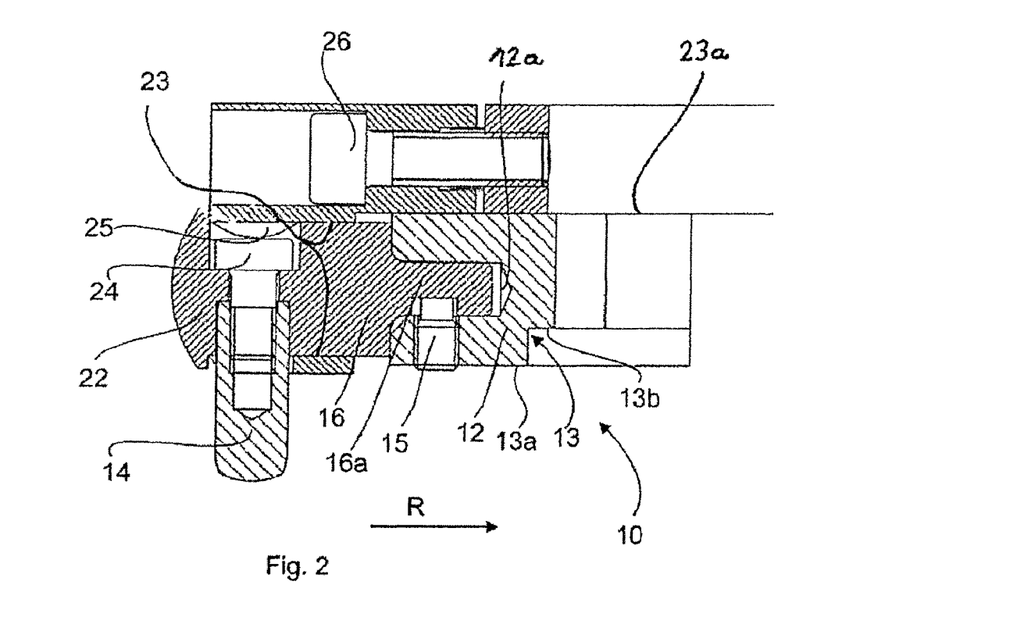
FIG. 2: A detailed view of a spacing element in accordance with the disclosure.

FIG. 2 depicts a cross-sectional representation of a spacing element 10 in accordance with the disclosure. This spacing element 10 thereby has a fork-shaped spacing body 12 and a displacement body 16. This spacing body 12 and the displacement body 16 are thereby connected with one another by means of a screw connection 15. The reason for the two-part construction of the spacing element 10 lies in the fact that, as noted above, the spacing bodies 12 may vary in order to adjust to different containers 20. In order to save materials, however, the displacement body 16 can be kept the same size.

The displacement body 16 is displaceable in the direction R relative to a rail 28.

As noted above, the displacement of the mandrel 4 is brought about by the distance between the two recesses 13-a and 13-b. The displacement body 16 has a projection 16-a, which engages in a correspondingly adjusted recess 12-a of the spacing body 12. Furthermore, a guide bolt 14 is provided on the displacement body 16. This guide bolt 14 is thereby attached to the displacement body 16 by means of a screw 24. The screw 24 is thereby sunk relative to the surface of the displacement body 16. Reference number 25 thereby refers to a corresponding sunken recess for the screw 24. Reference number 22 refers to a catching bolt, which serves for the purpose of pressing the displacement body 16 in the direction of the arrow R in order to move the spacing element 10 onto the shaft 6 depicted in FIG. 1, and in order to thereby change the resting position of the mandrel 4.

A catching of the rail 28 is achieved by means of the screw 26. Reference number 23-*a* refers to a sliding surface of the rail 28 along which the spacing body 12 slides. Reference number 23 refers to a sliding surface of the rail 28 along which the displacement body 16 slides.

Figure 3:
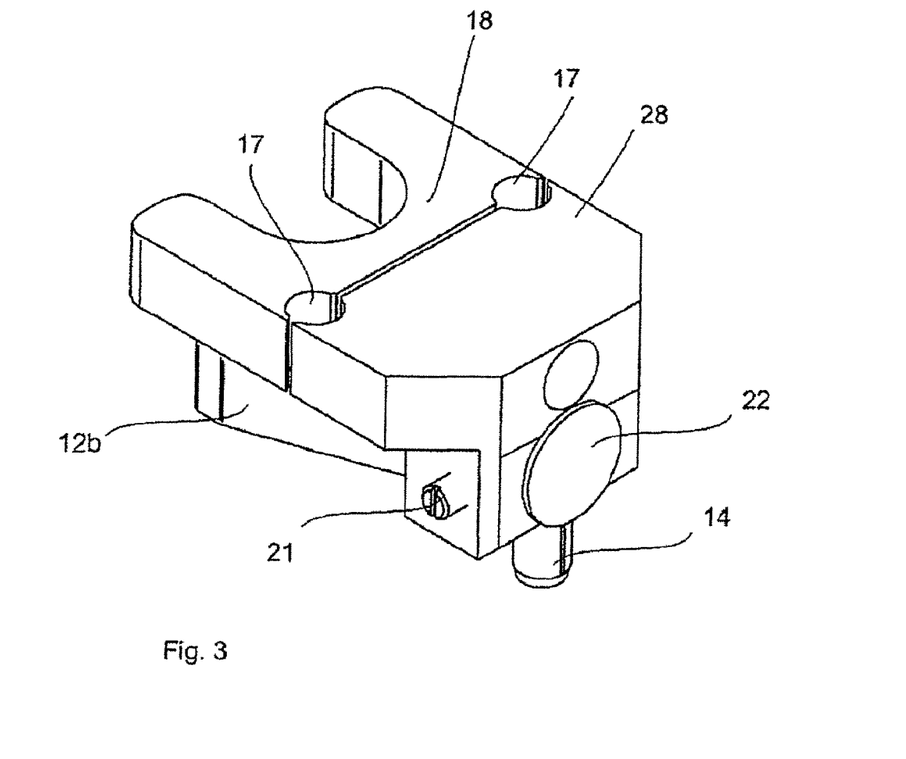
FIG. 3: A perspective view of a spacing element in accordance with the disclosure.

FIG. 3 depicts a perspective representation of the spacing element 10 in accordance with the disclosure. Reference number 18 thereby refers to a covering which covers the spacing body 12. At the same time, the covering 18 serves for the stabilization of the movement of the displacement body 12. Two arms 12-*a*, 12-*b* are provided on the displacement body 12, whereby only the left arm 12-*b* is visible here. In the inserted condition, these arms encompass the shaft 6 depicted in FIG. 1, at least in part. Reference number 17 refers to two apertures, by means of which the covering 18 can be stopped in relation to two shafts (not depicted). Stated more precisely, the shafts are inserted through the apertures 17 and the covering 18 is then tightened, relative to the rail 28, with the help of the screw 26 depicted in FIG. 2. Reference number 21 refers to a screw, on the opposing end of which a spherical contact part is provided. This screw serves for the catching of the catching bolt 22 opposite the displacement body 16.

Figure 4:
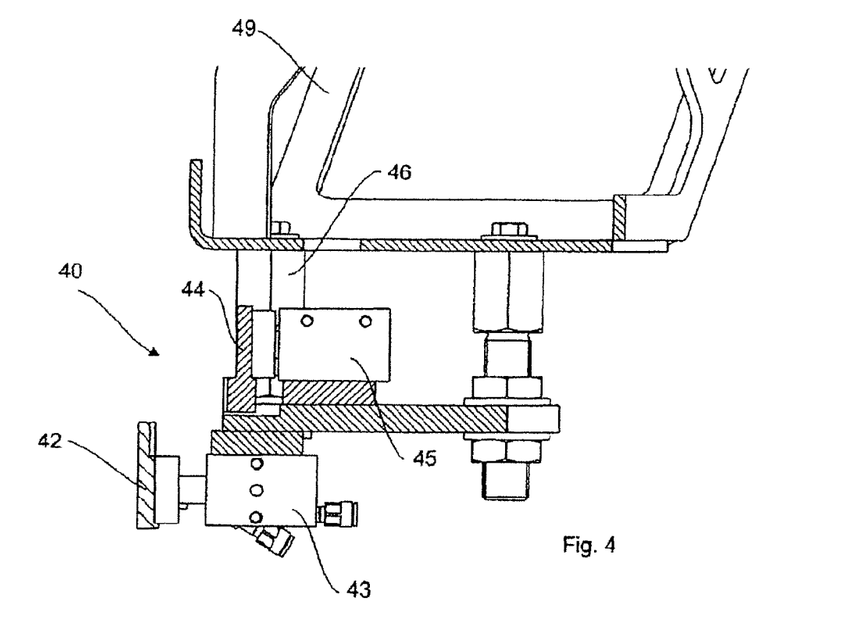
FIG. 4: A view of two adjustment elements.

FIG. 4 depicts an adjusting device 40, which serves for the adjustment of the spacing element 10. This adjusting device 40 thereby has a first adjusting device 42 and a second adjusting device 44. The first adjusting device 42, as mentioned above, engages with the guide bolt 14, and thereby serves for the extraction of the spacing element 10 from the shaft 6 (FIG. 1). The second adjusting device 42 acts on the catching bolt 22, and thereby serves to press the spacing element 10 in the direction of displacement R depicted in FIGS. 1 and 2. Reference numbers 43 and 45 respectively refer to drive units for the two adjusting devices 42 and 44. These may thereby be hydraulic, pneumatic, or motor elements, as well as also magnetic elements.

Reference number 49 refers to a support on which the adjusting devices 42 and 44 are positioned by means of a linkage assembly 46.

Figure 5:
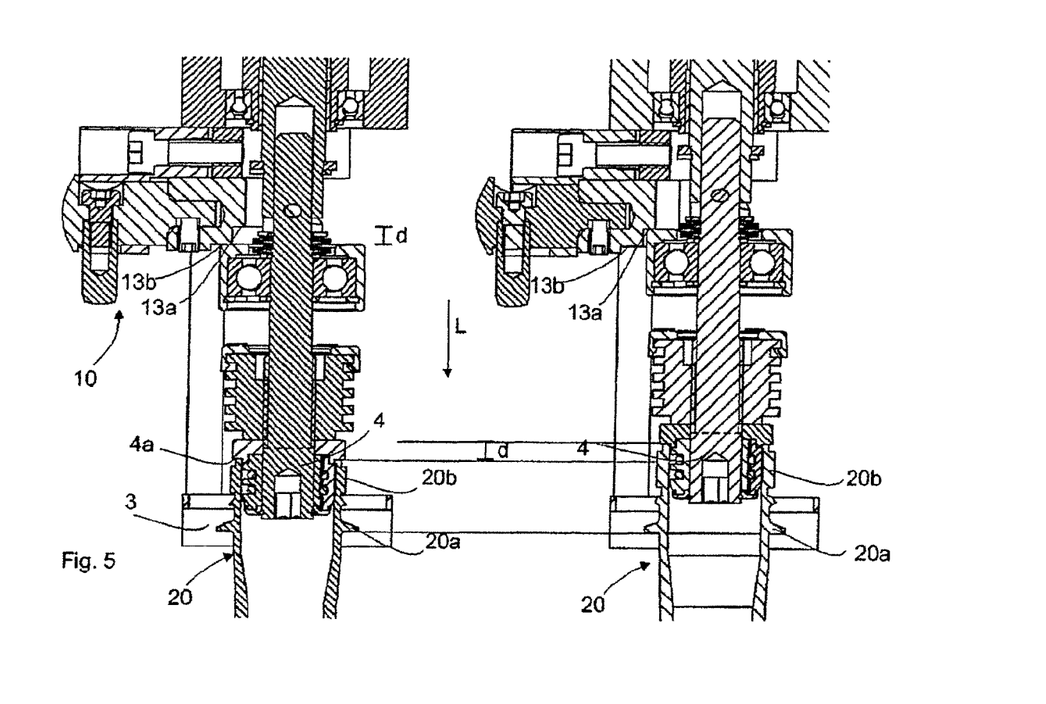
FIG. 5: A comparison of two working positions of the device in accordance with the disclosure.

FIG. 5 depicts a comparison of two devices in accordance with FIG. 1 in different conditions, whereby working position number one for short apertures is depicted on the left, and working position number two for long apertures is depicted on the right. Reference number 20 thereby refers to a container, while reference number 20-*b* refers to the aperture of the container 20. This aperture 20-*b* has a collar 20-*a*, which is positioned in the area of the shielding 3. In the partial diagram on the left, the container 20 thereby has a shorter aperture or a shorter threading, as the case may be, than in the partial diagram on the right. The mandrel 4 is accordingly lower in the left partial diagram than in the right partial diagram and, stated more precisely, by that distance d by which the aperture heights differ. Furthermore, it is evident in the left partial diagram that the spacing element 10 is inserted here, and that the support 8 is supported relative to the surface 13-*b*.

In the right partial diagram, the support 8 or a support casing, as the case may be, is supported on the surface 13-*a*. Here, the spacing element 10 is drawn out against the direction R.

Figure 6:
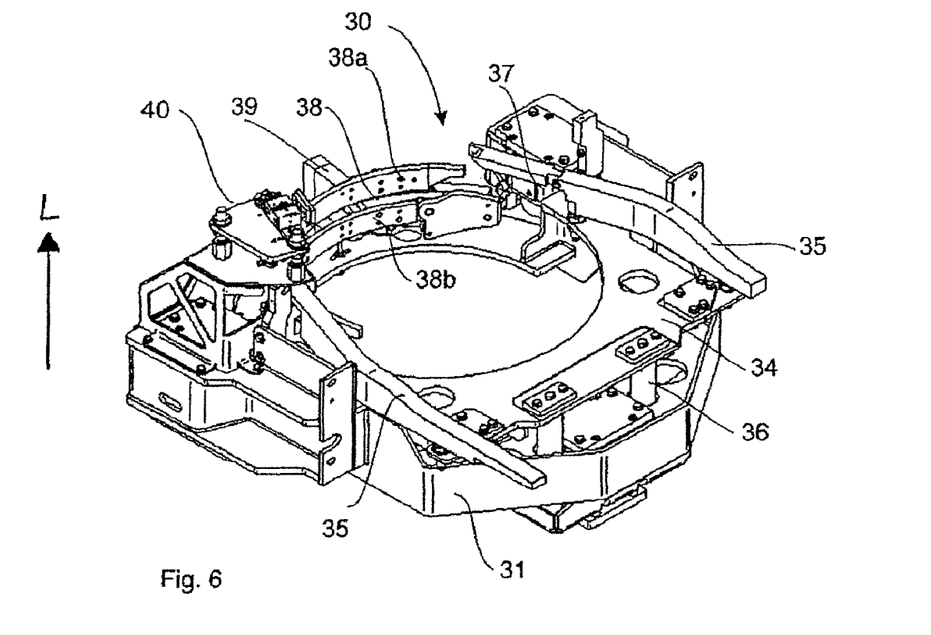
FIG. 6: An apparatus in accordance with the disclosure for the handling of containers.

FIG. 6 depicts a view from below of an apparatus 30 in accordance with the disclosure for the handling of containers 20. As mentioned above, it is achieved, by means of the spacing element 10 inserted between the chain link and the mandrel 4, that the depth of immersion of the mandrel 4 in the shielding plate 3 can be changed. A variable depth of immersion along the heating interval can thereby be achieved.

Because of the different aperture heights, the transfer heights—that is to say, the transfer heights (height of the collar 20-*a*) in the intake star wheel of the oven and in the intake star wheel of the blowing module following the same—can be changed. This change is equalized by means of an adjustable height device, on which the guide- and control head cam are positioned.

In FIG. 6, reference numbers 35, 38 refer to a lead cam—that is to say, the cam along which the mandrel support 2-*a* of the device depicted in FIG. 1 slides. The position of the mandrel 4 is jointly determined by the form of this lead cam.

In FIG. 6, the lead cam 35 extends, first of all, along the area designated by reference number 35 and then between two guide rails 38-*a* and 38-*b*. Reference number 37 schematically depicts a cylinder by means of which the entire lead cam 35, 38, 38-*a*, 38-*b* can be displaced along the direction L. Reference number 40 refers, in turn, to the apparatus, depicted in FIG. 4, for the shifting of the spacing element 10. It is thereby possible to likewise shift the lead cam 35 to a distance adjusted to the changes in the length of the threading, and to thereby balance out the transfer heights again. Reference number 31 refers to a framework of the apparatus 30.

In FIG. 6, the adjustment of the height is carried out, in addition to the lifting cylinder 37 depicted, with additional correspondingly positioned lifting cylinders. These additional lifting cylinders are not completely visible in FIG. 6. The device 1 is thereby displaced in the direction L through the adjustment of the lead cam 35.

Figure 7:
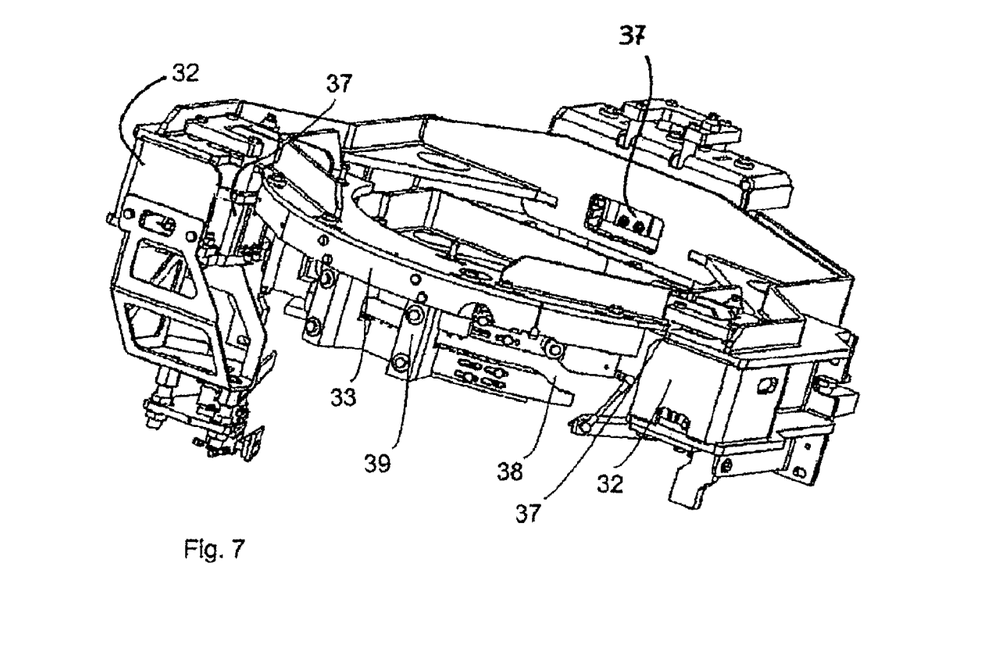
FIG. 7: An additional view of the device in accordance with the disclosure.

FIG. 7 depicts a view of the apparatus of FIG. 6 from behind. The lead cam 38 can thereby also be noted here again. This lead cam 38 is mounted to a support 33 by means of attachment devices 39. This support 33 can be adjusted in the direction L with the help of a drive unit 32, which activates the cylinder 37.

All of the characteristics disclosed in the application documents are claimed as essential to the disclosure, insofar as they are novel relative to the state of the art, whether individually or in combination.

The invention claimed is:

1. A device (1) for the heating of containers (20), comprising: a heating device, a mandrel (4), the cross-section of the mandrel (4) being adjusted to the cross-section of a container to be handled (20), and which guides the containers through heating device, whereas the mandrel (4) being displaceable relative to a support (2) along a direction of movement (L) between a resting position and a working position, a spacing element (10) which is displaceable relative to the mandrel (4) in a direction of displacement (R) between at least two positions, the direction of displacement (R) and the direction of movement (L) forming an angle with one another that differs by 0°, and the spacing element (10) being constructed in such a manner that the resting position of the mandrel (4) along the direction of movement (L) is changed by a shifting of the spacing element (10).

2. A device (1) in accordance with claim 1, wherein, the spacing element (10) is displaceable in a direction proceeding essentially perpendicular to the direction of movement (L).

3. A device (1) in accordance with claim 1, wherein the spacing element (10) has a fork-shaped spacing body (12).

4. A device (1) in accordance with claim 1, wherein the mandrel (4) is positioned rotatably around its axis (A), whereby the spacing body (12) partially surrounds the shaft (6) in one position of the spacing element (10).

5. A device (1) in accordance with claim 1, and a guide bolt (14) is positioned on the spacing element (10), whereby the guide bolt (14) extends in the direction of movement (L).

6. A device (1) in accordance with a claim 3 wherein the spacing body (12) is positioned detachably on a displacement body (16).

7. A device (1) in accordance with a claim 3, and a first adjusting device (42) which is positioned, at least occasionally, between the guide bolt (14) and the spacing body (12).

8. A device (1) in accordance with claim 7, and a second adjusting device (44), and the spacing element (10) is positioned, at least occasionally, between the second adjusting device (44) and the shaft (6).

9. A device (1) in accordance with claim 8, wherein the first adjusting device (42) and the second adjusting device (44) are displaced laterally to one another in the direction of movement (L).

10. An apparatus for the heating of containers, including:
a heating device,
a device for the handling of containers comprising a mandrel having a cross-section being adjusted to the cross-section of a container to be handled, and which guides the containers through the heating device, whereas the mandrel being displaceable relative to a support along a direction of movement between a resting position and a working position; and
a guide rail that carries out a displacement of the device along a direction of displacement, the guide rail being movable in the direction of displacement.

11. An apparatus in accordance with claim 10, the device having a spacing element that is displaceable relative to the mandrel in a direction of displacement between at least two positions, the direction of displacement and the direction of movement forming an angle with one another that varies by 0°, and the spacing element being constructed in such a manner that the resting position of the mandrel along the direction of movement is changed by shifting of the spacing element.

12. A device (1) for the handling of containers (20), comprising a mandrel (4), the cross-section of the mandrel (4) being adjusted to the cross-section of a container to be handled (20), the mandrel (4) being displaceable relative to a support (2) along a direction of movement (L) between a resting position and a working position, a spacing element (10) which is displaceable relative to the mandrel (4) in a direction of displacement (R) between at least two positions, the direction of displacement (R) and the direction of movement (L) forming an angle with one another that differs by 0°, and the spacing element (10) being constructed in such a manner that the resting position of the mandrel (4) along the direction of movement (L) is changed by a shifting of the spacing element (10),
wherein the spacing element (10) has a fork-shaped spacing body (12),
a first adjusting device (42) which is positioned, at least occasionally, between the guide bolt (14) and the spacing body (12), and
a second adjusting device (44), and the spacing element (10) is positioned, at least occasionally, between the second adjusting device (44) and the shaft (6).

13. A device (1) for the handling of containers (20), comprising a mandrel (4), the cross-section of the mandrel (4) being adjusted to the cross-section of a container to be handled (20), the mandrel (4) being displaceable relative to a support (2) along a direction of movement (L) between a resting position and a working position, a spacing element (10) which is displaceable relative to the mandrel (4) in a direction of displacement (R) between at least two positions, the direction of displacement (R) and the direction of movement (L) forming an angle with one another that differs by 0°, and the spacing element (10) being constructed in such a manner that the resting position of the mandrel (4) along the direction of movement (L) is changed by a shifting of the spacing element (10),
wherein the spacing element (10) has a fork-shaped spacing body (12),
a first adjusting device (42) which is positioned, at least occasionally, between the guide bolt (14) and the spacing body (12), and
a second adjusting device (44), and the spacing element (10) is positioned, at least occasionally, between the second adjusting device (44) and the shaft (6),
wherein the first adjusting device (42) and the second adjusting device (44) are displaced laterally to one another in the direction of movement (L).

* * * * *

UNITED STATES PATENT AND TRADEMARK OFFICE
CERTIFICATE OF CORRECTION

PATENT NO. : 8,267,387 B2
APPLICATION NO. : 12/046985
DATED : September 18, 2012
INVENTOR(S) : Stoiber et al.

Page 1 of 1

It is certified that error appears in the above-identified patent and that said Letters Patent is hereby corrected as shown below:

In the Claims

In Column 8, Line 44, in Claim 1, delete "through" and insert -- through the --, therefor.

In Column 9, Line 1, in Claim 6, delete "claim 3" and insert -- claim 3, --, therefor.

Signed and Sealed this
Seventh Day of October, 2014

Michelle K. Lee
*Deputy Director of the United States Patent and Trademark Office*